UNITED STATES PATENT OFFICE.

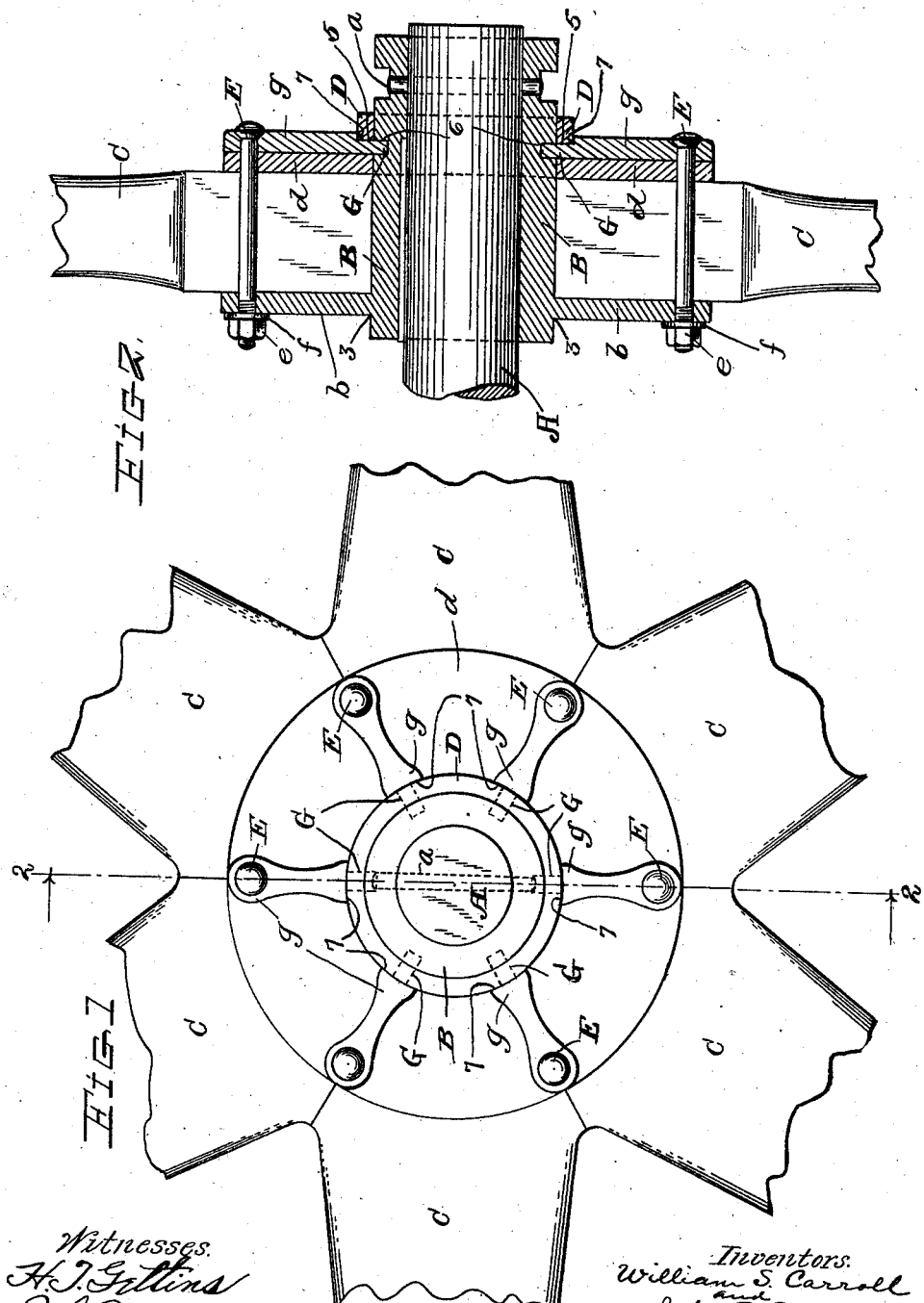

WILLIAM S. CARROLL AND JOHN T. ROWLES, OF BELLAIRE, OHIO.

VEHICLE-WHEEL.

986,687.  Specification of Letters Patent. Patented Mar. 14, 1911.

Application filed September 19, 1910. Serial No. 582,590.

*To all whom it may concern:*

Be it known that we, WILLIAM S. CARROLL and JOHN T. ROWLES, both citizens of the United States of America, both residing at Bellaire, in the county of Belmont and State of Ohio, have invented certain new and useful Improvements in Vehicle-Wheels; and we do hereby declare the following to be a full, clear, and exact description of the invention, such as will enable others skilled in the art to which it pertains to make and use the same.

This invention relates to improvements in vehicle-wheels, and more especially to the hubs of the driving wheels of automobiles.

The general practice heretofore has been to clamp the spokes of a vehicle-wheel of the character indicated between a flange on the inner end portion of the body of the hub of the wheel and a plate or annular member loosely mounted on the hub-body between the said flange and the outer end of the hub. By this construction a severing or separation of the said flange from the hub-body left all of the wheel excepting the hub-body free to move toward the outer end of and off the hub-body, and consequently from the shaft or axle to which the said hub-body is fixed.

The primary object of this invention is, first, to render the aforesaid flange less liable to be severed or separated from the body of the hub, and, second, to prevent any portion of the wheel, should the said flange become severed or separated from the body of the hub, from moving off the shaft or axle on which the wheel is mounted.

With these objects in view, and to the end of rendering the construction simple and durable, this invention consists in certain features of construction, and arrangement and combinations of parts, hereinafter described, pointed out in the claims, and illustrated in the accompanying drawings.

In the said drawings, Figure 1 is an elevation of the central portion of a vehicle-wheel embodying our invention, looking at the outer end of the shaft or axle on which the wheel is mounted. Fig. 2 is a vertical section on line 2—2, Fig. 1, looking in the direction indicated by the arrow.

Referring to the drawings, A indicates a horizontally arranged shaft or axle on which is operatively mounted a wheel embodying our invention. B represents the body of the hub of the said wheel, which body is operatively mounted on an end portion of the shaft or axle A, being shown fixed to the latter by a pin $a$. The hub-body B is provided in suitable proximity to the inner end of the hub and externally with a laterally and outwardly projecting annular flange $b$ which consequently extends circumferentially of the hub and is of course spaced inwardly a suitable distance from the outer end of the hub. A collar D is slipped onto the hub-body B from the outer end of the hub and consequently mounted on the hub-body between the said end of the hub and the flange $b$ and spaced a suitable distance from the latter. The collar D is provided at its inner end with a laterally and outwardly projecting annular flange $d$ which consequently extends circumferentially of the collar, and it will be observed that the collar is spaced far enough from the hub-flange $b$ to accommodate the interposition, between the last-mentioned flange and the flange of the collar, of the spokes C of the wheel, which spokes are arranged radially relative to the hub in the usual manner. The body of the hub is provided at its circumferential surface with cavities 6 which are arranged between the outer end of the hub and the flange $d$ of the collar D and preferably next to the outer side of the said flange. The cavities 6 are spaced circumferentially of the hub. The collar D is provided preferably next the outer side of its flange $d$ with holes 5 which extend from the exterior to the interior of the collar and are spaced circumferentially of the collar, and each hole 5 is arranged in registry with a cavity 6 in the hub-body and arranged substantially radially relative to
the hub.

By the construction hereinbefore described it will be observed that the hub-body B is provided at its circumferential surface with cavities 6 formed in and spaced circumferentially of the collar-surrounding portion of the hub-body, and that the collar, which is consequently mounted on the cavitied portion of the hub, is provided with holes 5 which are spaced circumferentially of the hub and arranged in registry with the different aforesaid cavities respectively. Each hole 5 in the collar D is engaged by a pin G which extends through the said hole into the cavity 6 which is arranged in registry with the said hole. Externally of the collar the said pin has an extension $g$ which projects laterally of and outwardly from the collar and overlaps and is arranged substantially radially of the outer side of the flange $d$ of the collar, and preferably the extension $g$ of each pin G extends substantially to the external surface or periphery of the said flange.

The hub-flange $b$, spokes C, collar-flange $d$ and extensions $g$ of the pins G are shown clamped together, and the means employed in securing the said pin-extensions, the said flanges, and the spokes together preferably comprise bolts E which are arranged horizontally and parallel with the hub and spaced circumferentially of the hub. The bolts E extend through the extensions $g$ of the pins G and through the collar-flange $d$ to and through the hub-flange $b$. Preferably the bolts E have their heads countersunk in the outer end portions of the extensions $g$ of the pins G, as shown in Fig. 2, and have their shanks extending from within the said pin-extensions through the collar-flange $d$ to and through the hub-flange $b$ and a suitable distance inwardly beyond the last-mentioned flange. Nuts $e$ are screwed onto the bolt-shanks at the inwardly facing side of the hub-flange $b$, and washers $f$ are interposed between the nuts and the said flange. It will be observed therefore that the bolts are connected at one end to the extensions $g$ of the pins and at the other end to the flange $b$ of the hub, and that upon manipulating the nuts $e$ to tighten the same the said flange, spokes C, collar-flange $d$ and extensions $g$ of the pins are clamped together.

By the construction hereinbefore described it will be observed that the pins G constitute substantially radially arranged members which are spaced circumferentially of the hub at the outer side of the flange $d$ of the collar and extend through the collar into the body of the hub, and that the said pins or circumferentially spaced members have extensions overlapping the said side of the said flange and connected with the flange $b$ of the hub through the medium of the bolts E and nuts $e$, and it will be observed therefore that displacement of the collar D circumferentially of the hub-body is positively prevented and the hub-flange $b$ is not liable to be severed from the body of the hub at the point indicated by the reference-numeral 3 in Fig. 2, and the said flange, should it become severed or separated from the hub-body at the said point, will still be held in place relative to the hub-body through the medium of the bolts E, nuts $e$, pins G and collar D. Preferably the circumferentially spaced pins or members G are each provided at the circumferential surface or periphery of the collar D with a shoulder 7 which faces in the direction of the axis of the hub and abuts against or overlaps the said surface. The shoulders 7 of the pins or members G afford a bearing to and operate to brace or reinforce the said members on the circumferential surface or periphery of the collar. It will be observed also that in our improved construction displacement of any one of the pins G independently of the other of the said pins, should the hub-flange $b$ become severed from the hub-body as hereinbefore described, is rendered impossible because the said pins are effectively connected together by the collar D which affords lateral bearing to and materially reinforces the said pins.

What we claim is:—

1. In a vehicle-wheel, a hub having its body provided externally with a laterally and outwardly projecting flange which extends circumferentially of the hub and is spaced inwardly from the outer end of the hub; a collar mounted on the hub-body between the outer end of the hub and the said flange and spaced from the latter, which collar is provided at its inner end with a laterally and outwardly projecting flange extending circumferentially of the collar; members spaced circumferentially of the hub at the outer side of the last-mentioned flange and extending through the collar into the hub-body; spokes interposed between the last-mentioned and first-mentioned flanges, and means whereby the said circumferentially spaced members, the said flanges and the spokes are secured together.

2. In a vehicle-wheel, a hub having its body provided externally with a laterally and outwardly projecting flange which extends circumferentially of the hub and is spaced inwardly from the outer end of the hub; a collar mounted on the hub-body between the outer end of the hub and the said flange and spaced from the latter, which collar is provided at its inner end with a laterally and outwardly projecting flange extending circumferentially of the collar; pins extending through the collar into the hub-body, which pins are spaced circumferentially of the hub and have extensions which overlap and are arranged substantially radially of the outer side of the last-mentioned flange, said pins being provided with shoulders overlapping the circumferential surface of the collar; spokes interposed between the last-mentioned and first-mentioned flanges, and means whereby the said extensions of the pins, the said flanges and the spokes are secured together.

3. In a vehicle-wheel, a hub having its body provided externally with a laterally and outwardly projecting flange which extends circumferentially of the hub and is spaced inwardly from the outer end of the hub, said hub-body being provided at its circumferential surface with cavities arranged between the outer end of the hub and the said flange and spaced from the latter and circumferentially of the hub; a collar mounted on the cavitied portion of the hub-body and provided with a laterally and outwardly projecting flange extending circumferentially of the collar, said collar having holes which extend from the exterior to the interior of the collar and are spaced circumferentially of the hub and in registry with the different aforesaid cavities respectively; members extending through the said holes in the collar and engaging the said cavities and overlapping the outer side of the last-mentioned flange; spokes interposed between the last-mentioned and first-mentioned flanges, and means whereby the said cavity-engaging members, the said flanges and the spokes are secured together.

Signed by us at Cleveland, Ohio this 12th day of September, 1910.

WILLIAM S. CARROLL.
JOHN T. ROWLES.

Witnesses:
V. C. LYNCH,
C. H. DORER.

---

Copies of this patent may be obtained for five cents each, by addressing the "Commissioner of Patents, Washington, D. C."